United States Patent
Kaneko

(10) Patent No.: US 7,914,697 B2
(45) Date of Patent: Mar. 29, 2011

(54) REFRIGERATING MACHINE OIL COMPOSITION

(75) Inventor: Masato Kaneko, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 12/282,356

(22) PCT Filed: Feb. 22, 2007

(86) PCT No.: PCT/JP2007/053317
§ 371 (c)(1), (2), (4) Date: Sep. 10, 2008

(87) PCT Pub. No.: WO2007/105452
PCT Pub. Date: Sep. 20, 2007

(65) Prior Publication Data
US 2009/0062167 A1    Mar. 5, 2009

(30) Foreign Application Priority Data
Mar. 10, 2006    (JP) .................. 2006-066482

(51) Int. Cl.
*C09K 5/04* (2006.01)
*C10M 169/00* (2006.01)
(52) U.S. Cl. ............... 252/68; 252/67; 252/69; 508/110
(58) Field of Classification Search .................. 252/68, 252/67, 69; 508/110
See application file for complete search history.

(56) References Cited

U.S. PATENT DOCUMENTS

| | | | | |
|---|---|---|---|---|
| 5,295,357 A | * | 3/1994 | Kaneko | 62/84 |
| 6,008,169 A | * | 12/1999 | Kaneko | 508/501 |
| 6,074,573 A | * | 6/2000 | Kaneko | 252/68 |
| 6,231,782 B1 | * | 5/2001 | Shimomura et al. | 252/68 |
| 6,261,474 B1 | * | 7/2001 | Egawa et al. | 252/68 |
| 2007/0272893 A1 | * | 11/2007 | Kaneko | 252/68 |
| 2009/0090128 A1 | * | 4/2009 | Kaneko | 62/498 |

FOREIGN PATENT DOCUMENTS

| | | | |
|---|---|---|---|
| JP | 61 062596 | | 3/1986 |
| JP | 1198694 A | * | 8/1989 |
| JP | 08 135585 | | 5/1996 |
| JP | 10265790 A | * | 10/1998 |
| JP | 11 106775 | | 4/1999 |
| JP | 11 124590 | | 5/1999 |
| JP | 2001 294886 | | 10/2001 |
| JP | 2002 518582 | | 6/2002 |
| JP | 2005 325151 | | 11/2005 |
| WO | WO 02079358 A2 | * | 10/2002 |

* cited by examiner

Primary Examiner — Douglas MC Ginty
(74) Attorney, Agent, or Firm — Oblon, Spivak, McClelland, Maier & Neustadt, L.L.P.

(57) ABSTRACT

The refrigerating machine oil composition of the invention is characterized by containing a mixed base oil which has a kinematic viscosity at 40° C. of 0.11 to 8 mm$^2$/s and which is composed of a low-viscosity base oil (A) having a kinematic viscosity at 40° C. of 5 mm$^2$/s or lower, and a high-viscosity base oil (B) having a kinematic viscosity at 40° C. of 20 to 400 mm$^2$/s, each of the base oil (A) and (B) being composed of at least one species selected from among a mineral oil, a synthetic hydrocarbon compound, an oxygen-containing compound, and a sulfur-containing compound. The refrigerating machine oil composition exhibits enhanced energy saving performance by virtue of its low viscosity, has excellent sealing performance and load resistance, and can be employed in various refrigeration means, particularly suitably in a closed-type refrigerator.

18 Claims, No Drawings

REFRIGERATING MACHINE OIL COMPOSITION

TECHNICAL FIELD

The present invention relates to a refrigerating machine oil composition and, more particularly, to a refrigerating machine oil composition which exhibits enhanced energy saving performance by virtue of its low viscosity, which has excellent sealing performance and load resistance, and which can be employed in various refrigeration fields, particularly suitably in a closed-type refrigerator.

BACKGROUND ART

Generally, a compression-type refrigerator includes a compressor, a condenser, an expansion mechanism (e.g., expansion valves), an evaporator, and an optional drying apparatus, and a liquid mixture of refrigerant and lubricating oil (refrigerator oil) circulates in a closed system of the refrigerator. In such a refrigerator, generally, the compressor is operated at high temperature, while the cooler is operated at low temperature, although the difference in temperature varies depending on the type of the refrigerator. Therefore, a refrigerant and a lubricating oil must circulate in the system without causing phase separation within a wide temperature range of high to low temperature. Generally, a mixture of refrigerant and lubricating oil has a phase separating region in a low-temperature range and in a high-temperature range. The highest phase separation temperature in the low-temperature range is preferably −10° C. or lower, particularly preferably −20° C. or lower, whereas the lowest phase separation temperature in the high-temperature range is preferably 30° C. or higher, particularly preferably 40° C. or higher. When phase separation occurs during operation of a refrigerator, the service life and efficiency of the refrigerator are considerably impaired. For example, when phase separation between refrigerant and lubricating oil occurs in a compressor, lubrication of a movable member is impaired, thereby causing seizure or a similar phenomenon, resulting in considerable shortening of the service life of the refrigerator. When phase separation occurs in an evaporator, a viscous lubricant remains, thereby lowering heat exchange efficiency.

Hitherto, chlorofluorocarbons (CFCs), hydrochlorofluorocarbons (HCFCs), etc. have been often employed as refrigerants for refrigerators. However, since these compounds contain chlorine, causing an environmental problem, use of chlorine-free alternative refrigerants such as hydrofluorocarbons (HFCs) has been investigated. However, since HFCs are substances that possibly contribute to global warming, natural refrigerants such as hydrocarbon, ammonia, and carbon dioxide have become of interest for use as environmental friendly refrigerants.

Meanwhile, lubrication performance of a lubricating oil for refrigerators, which is employed for lubricating a movable member of a refrigerator, is an important property. Particularly when a lubricating oil works in a compressor at high temperature, the lubricating oil is required to exhibit such a viscosity that the oil provides a stable oil layer that attains sufficient lubrication. Generally, the required viscosity varies depending on the type of the employed compressor and operational conditions. Before being mixed with a refrigerant, the lubricating oil preferably has a kinematic viscosity of 10 to 200 mm$^2$/s at 40° C. It has also been accepted in the art that, when the viscosity is lower than this range, the oil layer becomes thin to readily cause lubrication failure, whereas when it is higher than the mentioned range, heat exchange efficiency is impaired.

There is disclosed a lubricating oil composition for use in a vapor-compressing refrigerating machine employing carbonate gas as a refrigerant, wherein the composition contains a lube base oil as a predominant ingredient, the lube base oil exhibiting a 10%-recovery temperature of 400° C. or higher and a 80%-recovery temperature of 600° C. or lower, as determined through simulated distillation by gas chromatography; a kinematic viscosity (at 100° C.) of 2 to 30 mm$^2$/s; and a viscosity index of 100 or higher (see, for example, Patent Document 1).

The kinematic viscosity of the base oil contained in the lubrication oil composition is 17 to 70 mm$^2$/s as determined at 40° C. (see Examples in Patent Document 1).

When a refrigerator oil having such a high viscosity is employed in a refrigerator, energy consumption of the refrigerator unavoidably increases. Thus, lowering viscosity of a refrigerator oil and improving friction characteristics during lubrication have been studied, for the purpose of saving energy of refrigerators.

Taking a refrigerating machine for refrigerators as an example, the viscosity of the lubricating oil was previously lowered to VG32, 22, 15, or 10, whereby energy saving effect was improved. However, further lowering the viscosity poses problems such as lowering sealing performance and lubricity.
Patent Document 1:
Japanese Patent Application Laid-Open (kokai) No. 2001-294886

DISCLOSURE OF THE INVENTION

Problems to be Solved by the Invention

Under such circumstances, an object of the present invention is to provide a refrigerating machine oil composition which exhibits enhanced energy saving performance by virtue of low viscosity, which has excellent sealing performance and load resistance, and which can be employed in various refrigeration fields, particularly suitably in a closed-type refrigerator.

Means for Solving the Problems

The present inventor has carried out extensive studies so as to develop a refrigerating machine oil composition having the aforementioned favorable properties, and have found that the object can be attained through use, as a base oil, of a mixed base oil which is composed of a base oil having a specific low viscosity and a base oil having a specific high viscosity and which is prepared by mixing these base oils so as to attain a specific low viscosity. The present invention has been accomplished on the basis of this finding.

Accordingly, the present invention provides the following.

1. A refrigerating machine oil composition, characterized by comprising a mixed base oil which has a kinematic viscosity at 40° C. of 0.11 to 8 mm$^2$/s and which is composed of a low-viscosity base oil (A) having a kinematic viscosity at 40° C. of 5 mm$^2$/s or lower, and a high-viscosity base oil (B) having a kinematic viscosity at 40° C. of 20 to 400 mm$^2$/s, each of the base oil (A) and (B) being composed of at least one species selected from among a mineral oil, a synthetic hydrocarbon compound, an oxygen-containing compound, and a sulfur-containing compound.

2. A refrigerating machine oil composition as described in 1 above, wherein the low-viscosity base oil (A) has a kinematic viscosity at 40° C. of 0.1 to 2.8 mm²/s.

3. A refrigerating machine oil composition as described in 1 above, which has a ratio by mass of low-viscosity base oil (A) to high-viscosity base oil (B), represented by (A):(B), is 99 to 5:1 to 95.

4. A refrigerating machine oil composition as described in 1 above, wherein the low-viscosity base oil is composed of a mineral oil and has a sulfur content of 50 mass ppm or less.

5. A refrigerating machine oil composition as described in 1 above, wherein the synthetic hydrocarbon compound is at least one compound selected from a C2 to C20 olefin homopolymer or copolymer, a hydrogenation product thereof, an alicyclic hydrocarbon compound having a cyclohexyl group, and a linear-chain or branched-chain alkyl group-substituted aromatic compound.

6. A refrigerating machine oil composition as described in 1 above, wherein the synthetic hydrocarbon compound is a C6 to C20 α-olefin oligomer or a hydrogenation product of the α-olefin oligomer.

7. A refrigerating machine oil composition as described in 6 above, wherein the C6 to C20 α-olefin oligomer is produced in the presence of a metallocene catalyst.

8. A refrigerating machine oil composition as described in 1 above, wherein the oxygen-containing compound or the sulfur-containing compound is at least one compound selected from among an ether compound, a thioether compound, a ketone compound, an alcohol compound, and a thioalcohol compound.

9. A refrigerating machine oil composition as described in 8 above, wherein the ether compound is at least one compound selected from among a monoether compound, an oxyalkylene glycol derivative, and a polyvinyl ether compound.

10. A refrigerating machine oil composition as described in 1 above, which contains at least one additive selected from among an extreme pressure agent, an oiliness agent, an antioxidant, an acid-scavenger, and a defoaming agent.

11. A refrigerating machine oil composition as described in 1 above, which is employed in a refrigerating machine employing a hydrocarbon-based, carbon dioxide-based, hydrofluorocarbon-based, or ammonia-based refrigerant.

12. A refrigerating machine oil composition as described in 11 above, which is employed in a refrigerating machine employing a hydrocarbon-based refrigerant.

13. A refrigerating machine oil composition as described in 1 above, which is employed in a refrigerating machine having a sliding member made of an engineering plastic material or covered with an organic or inorganic coating film.

14. A refrigerating machine oil composition as described in 13 above, wherein the organic coating film is polytetrafluoroethylene coating film, polyimide coating film, or polyamide-imide coating film.

15. A refrigerating machine oil composition as described in 13 above, wherein the inorganic coating film is graphite film, diamond-like carbon film, tin film, chromium film, nickel film, or molybdenum film.

16. A refrigerating machine oil composition as described in 1 above, which is for use in a refrigerating system, a hot water supply system, or a refrigerating-heating system of an automobile air conditioner, a gas heat pump, an air conditioner, a refrigerator, an automatic vending machine, or a showcase.

17. A refrigerating machine oil composition as described in 16 above, wherein the systems have an inside water content of 60 mass ppm or less and an inside residual air content of 8 kPa or less.

Effects of the Invention

According to the present invention, there is provided a refrigerating machine oil composition which exhibits enhanced energy saving performance by virtue of its low viscosity, which has excellent sealing performance and load resistance, and which can be employed in various refrigeration fields, particularly suitably in a closed-type refrigerator.

BEST MODES FOR CARRYING OUT THE INVENTION

The refrigerating machine oil composition according to the present invention employs a mixed base oil composed of a low-viscosity base oil (A) and a high-viscosity base oil (B), each base oil being composed of a specific base oil (compound). The low-viscosity base oil (A) is required to have a kinematic viscosity at 40° C. of 5 mm²/s or less, preferably 3.0 mm²/s or less, more preferably 2.8 mm²/s or less. When the low-viscosity base oil (A) has a kinematic viscosity at 40° C. higher than 5 mm²/s, the kinematic viscosity of the mixed base oil is difficult to regulate to fall within a predetermined range, thereby failing to attain the object of the present invention; i.e., improvement of energy saving performance. Although no particular limitation is imposed on the lower limit of the kinematic viscosity at 40° C. of the low-viscosity base oil (A), the base oil (A) must be liquid at room temperature, from the viewpoint of handling. Furthermore, in order to ensure a required flash point, the kinematic viscosity is preferably 0.1 mm²/s or higher, more preferably 0.2 mm²/s or higher, still more preferably 0.5 mm²/s or higher.

The low-viscosity base oil (A) preferably has a flash point of 0° C. or higher, more preferably 20° C. or higher, still more preferably 50° C. or higher. The molecular weight distribution factor (weight average molecular weight/number average molecular weight) is 1.5 or less, preferably 1.2 or less. When the flash point and the molecular weight distribution factor satisfy the aforementioned requirements, decrease in sealing performance can be prevented.

The high-viscosity base oil (B) is required to have a kinematic viscosity at 40° C. of 20 mm²/s or higher, preferably 30 mm²/s or higher, particularly preferably 32 mm²/s or higher. When the high-viscosity base oil (B) has a kinematic viscosity at 40° C. of 20 mm²/s or higher, both sealing performance and lubricity can be enhanced. The upper limit of the kinematic viscosity at 40° C. of the high-viscosity base oil (B) is 400 mm²/s, preferably 200 mm²/s, more preferably 150 mm²/s. When the high-viscosity base oil (B) has a kinematic viscosity at 40° C. of 400 mm²/s or less, the kinematic viscosity at 40° C. of the mixed base oil can be maintained within a predetermined low viscosity range, and sealing performance and lubricity can be enhanced.

According to the present invention, the low-viscosity base oil (A) and the high-viscosity base oil (B) essentially satisfy the aforementioned conditions of the kinematic viscosity at 40° C. Each of these base oils is composed of at least one species selected from among (1) a mineral oil, (2) a synthetic hydrocarbon compound, (3) an oxygen-containing compound, and (4) a sulfur-containing compound.

Preferred species of the low-viscosity base oil (A) employed in the present invention will next be described.

One example of the mineral oil (1) is a refined fraction produced through subjecting a lube oil fraction which has been obtained through distillation of crude oil (e.g., paraffin, intermediate base, or naphthene) at ambient pressure or distillation of the residue under reduced pressure, to at least one treatment such as solvent deasphalting, solvent extraction, hydro-cracking, solvent dewaxing, or hydro-refining. Another example of the mineral base oil is a base oil produced through isomerization of mineral oil wax or isomerization of wax (gas-to-liquid wax) produced through, for example, the Fischer-Tropsch process.

These mineral oils preferably have a sulfur content of 400 mass ppm or less, more preferably 100 mass ppm or less, particularly preferably 50 mass ppm or less, still more preferably 30 mass ppm or less. These mineral oils preferably have an aromatic content (% CA) of 5 or less, more preferably 3 or less, still more preferably 1 or less. When a mineral oil has a sulfur content of 400 mass ppm or less and an aromatic content (% CA) of 5 or less, excellent stability to oxidation can be attained.

The low-viscosity base oil (A) may be selected from such mineral oils having a kinematic viscosity at 40° C. of 5 mm²/s or lower. Particularly, those having a sulfur content of 50 mass ppm or less are preferred, with those having a sulfur content of 30 mass ppm or less being more preferred.

The synthetic hydrocarbon compound (2) may be any of a linear-chain hydrocarbon compound, a branched-chain hydrocarbon compound, an alicyclic hydrocarbon compound, and an aromatic hydrocarbon compound. Among them, those having 5 to 24 carbon atoms in total are preferred as the low-viscosity base oil (A), with those having 6 to 20 carbon atoms in total being more preferred.

Examples of the linear-chain and branched-chain hydrocarbon compounds include C2 to C20 olefin homopolymers and copolymers and hydrogenation products thereof. Specific examples include homopolymers of a C2 to C4 olefin (e.g., ethylene, propylene, butylene, or isobuten); ethylene-(C3-C20) α-olefin copolymers; hydrogenation products thereof; α-olefin oligomers produced from a C6 to C20 α-olefin; and hydrogenation products thereof.

Notably, ethylene homopolymer and a hydrogenation product thereof are examples of the linear-chain hydrocarbon compound.

Examples of the C6 to C20 α-olefin oligomer and hydrogenation products thereof include such oligomers generally produced in the presence of a $BF_3$ catalyst or Ziegler catalyst, which is typically employed in polymerization, and hydrogenation products of the oligomers. Among them, α-olefin oligomers produced in the presence of the metallocene catalyst mentioned hereinbelow and hydrogenation products thereof are more preferred. Of these, hydrogenation products are particularly preferred.

Examples of the C6 to C20 α-olefin include 1-hexene, 1-octene, 1-decene, 1-dodecene, 1-tetradecene, 1-hexadecene, and 1-octadecene. Of these, 1-hexene, 1-octene, 1-decene, and 1-dodecene are preferred. These olefins may be used singly or in combination of two or more species.

One possible method for producing α-olefin oligomer in the presence of the metallocene catalyst will next be described.

Firstly, α-olefin is polymerized in the presence of a metallocene catalyst, to thereby produce an α-olefin oligomer. The metallocene catalyst used in the polymerization is preferably a combination of a complex having a conjugated 5-membered carbon ring holding a periodic table Group 4 element (i.e. a metallocene complex) and an oxygen-containing organic aluminum compound.

Examples of the periodic table Group 4 element contained in the metallocene complex include titanium, zirconium, and hafnium. Of these, zirconium is particularly preferred. The complex having a conjugated 5-membered carbon ring employed in the invention generally has a substituted or unsubstituted cyclopentadienyl ligand.

An appropriate metallocene complex may be selected from known metallocene compounds.

Examples of the metallocene complex include bis(n-octadecylcyclopentadienyl)zirconium dichloride, bis(trimethylsilylcyclopentadienyl)zirconium dichloride, bis(tetrahydroindenyl)zirconium dichloride, bis[(t-butyldimethylsilyl)cyclopentadienyl]zirconium dichloride, bis(di-t-butylcyclopentadienyl)zirconium dichloride, (ethylidene-bisindenyl)zirconium dichloride, biscyclopentadienyl)zirconium dichloride, ethylidenebis(tetrahydroindenyl)zirconium dichloride, and bis[3,3(2-methyl-benzindenyl)]dimethylsilanediylzirconium dichloride. These complexes may be used singly or in combination of two or more species.

Examples of the oxygen-containing organic aluminum compound include methylalmoxane, ethylalmoxane, and isobutylalmoxane. These compounds may be used singly or in combination of two or more species.

Oligomerization requires no particular solvent, and may be performed in a suspension, monomer liquid, or inert solvent. When oligomerization is performed in a solvent, benzene, ethylbenzene, toluene, etc. are employed. Preferably, oligomerization is performed in a medium in which monomer liquid is excessive.

As a post-treatment of oligomerization, the catalyst is deactivated through a known method, specifically, addition of water or alcohol thereto, or treatment with halogen-free acid, to thereby terminate oligomerization.

α-Olefin isomers which are formed as by-products during oligomerization may be removed through stripping after oligomerization reaction. Alternatively, these olefin isomers may be removed, without separating oligomerization products, after hydrogenation and distillation of hydrogenated oligomer.

The thus-treated oligomerization products are washed with an aqueous alkaline solution or an alcoholic alkaline solution, whereby the catalyst component is removed.

The thus-produced α-olefin oligomers include a dimer, a trimer, and a tetramer.

The α-olefin oligomers produced in the presence of a metallocene catalyst each have a double bond particularly with high end vinylidene double bond content. The α-olefin hydrogenation products of the present invention have a saturation structure where double bonds contained before hydrogenation have been hydrogenated.

In hydrogenation, known catalysts such as Ni-based or Co-based catalysts and noble metal catalysts (e.g., Pd and Pt) are employed. Specific examples of such catalysts include an Ni-on-diatomaceous earth catalyst, a cobalt tris(acetylacetonate)/organic aluminum catalyst, a palladium-on-activated carbon catalyst, and a platinum-on-alumina catalyst.

Hydrogenation is generally performed at 200° C. or less. When an Ni-based catalyst is employed, the hydrogenation temperature is about 150 to about 200° C., whereas when a noble metal catalyst (e.g., Pd or Pt) is employed, the temperature is about 50 to about 150° C. When a homogeneous reducing agent such as a cobalt tris(acetylacetonate)/organic aluminum is employed, the temperature is about 20 to about 100° C. Hydrogen pressure is generally ambient pressure to about 20 MPa.

The thus-produced hydrogenation product is distillated, whereby a fraction having a desired kinematic viscosity is recovered. The fraction is employed as a base oil of the present invention.

Among these α-olefin oligomers, 1-hexene dimer, 1-octene dimer, 1-decene dimer, 1-dodecene dimer, and a mixture thereof are preferred as the low-viscosity base oil (A). The corresponding hydrogenation products are more preferred. Such oligomers as produced in the presence of a metallocene catalyst are particularly preferred.

Examples of the synthetic alicyclic hydrocarbon compound include compounds having one or more cyclohexyl groups. Among them, such compounds each having 6 to 24 carbon atoms in total may be employed as the low-viscosity base oil (A).

Specific examples of the low-viscosity base oil composed of such a synthetic alicyclic hydrocarbon compound include cyclohexane (kinematic viscosity at 40° C.: 0.7 mm²/s), octylcyclohexane (1.5 mm²/s), dodecylcyclohexane (2.7 mm²/s), dibutylcyclohexane (1.6 mm²/s), and dihexylcyclohexane (2.6 mm²/s).

Examples of the synthetic aromatic hydrocarbon compound include compounds each having a linear-chain or branched-chain alkyl group on an aromatic ring. The aromatic group may have one or more linear-chain alkyl groups, which may be identical to or different from one another. Among them, such compounds each having 7 to 24 carbon atoms in total may be employed as the low-viscosity base oil (A).

Specific examples of the low-viscosity base oil composed of such a synthetic aromatic hydrocarbon compound include toluene (kinematic viscosity at 40° C.: 0.8 mm²/s), octylbenzene (1.6 mm²/s), dodecylbenzene (2.8 mm²/s), dibutylbenzene (1.7 mm²/s), and dihexylbenzene (2.7 mm²/s).

The oxygen-containing compound (3) or the sulfur-containing compound (4) is preferably at least one compound selected from among an ether compound, a thioether compound, a ketone compound, an alcohol compound, and a thioalcohol compound.

Examples of the ether compound include a monoether compound, an oxyalkylene glycol derivative, and polyvinyl ether.

The monoether compound may be a compound represented by, for example, formula (I):

$$R^1\text{—}O\text{—}R^2 \quad (I)$$

(wherein each of $R^1$ and $R^2$ represents a C1 to C20 monovalent hydrocarbon group).

Examples of the C1 to C20 monovalent hydrocarbon group represented by $R^1$ or $R^2$ in formula (I) include C1 to C20 linear-chain, branched-chain, and cyclic alkyl groups and alkenyl groups, C6 to C20 aryl groups, and C7 to C20 aralkyl groups. $R^1$ and $R^2$ may be identical to or different from each other.

Among them, compounds represented by formula (I) each having 4 to 24 carbon atoms in total are preferably employed as the low-viscosity base oil (A).

Typical examples of the low-viscosity base oil composed of a monoether compound represented by formula (I) include dibutyl ether (kinematic viscosity at 40° C.: 0.8 mm²/s), dioctyl ether (1.3 mm²/s), isooctyl hexadecyl ether (2.7 mm²/s), cyclohexyl decyl ether (1.9 mm²/s), and phenyl decyl ether (2.1 mm²/s).

In the present invention, a monothioether compound, which is formed by substituting the oxygen atom of the monoether compound represented by formula (I) by a sulfur atom, may also be employed. Specific examples of the low-viscosity base oil composed of such a monothioether compound include dioctyl thioether (kinematic viscosity at 40° C.: 1.5 mm²/s) and didecyl thioether (2.7 mm²/s).

Examples of the oxyalkylene glycol derivative include compounds represented by, for example, formula (II):

$$R^3\text{—}[(OR^4)_m\text{—}OR^5]_n \quad (II)$$

(wherein $R^3$ represents a hydrogen atom, a C1 to C10 monovalent hydrocarbon group, a C2 to C10 acyl group, or a C1 to C10 aliphatic hydrocarbon group having 2 to 6 bonding sites; $R^4$ represents a C2 to C10 alkylene group; $R^5$ represents a hydrogen atom, a C1 to C10 hydrocarbon group, or a C2 to C10 acyl group; n is an integer of 1 to 6; and m is a average number of 1 to 20).

Examples of the monovalent hydrocarbon group represented by $R^3$ or $R^5$ in formula (II) include C1 to C10 linear-chain, branched-chain, and cyclic alkyl groups and alkenyl groups, C6 to C10 aryl groups, and C7 to C10 aralkyl groups. $R^3$ and $R^5$ may be identical to or different from each other.

Among these monovalent hydrocarbon groups, an alkyl group is preferred. Specific examples of the alkyl group include methyl, ethyl, n-propyl, isopropyl, butyls, pentyls, hexyls, heptyls, octyls, nonyls, decyls, cyclopentyl, and cyclohexyl. When the monovalent hydrocarbon group has more than 10 carbon atoms, compatibility with a refrigerant decreases, possibly causing phase separation.

The alkyl moiety of the C2 to C10 acyl group represented by $R^3$ or $R^5$ may be linear-chain, branched-chain, or cyclic.

When each of $R^3$ and $R^5$ is an alkyl group or an acyl group, $R^3$ and $R^5$ may be identical to or different from each other.

When n is 2 or more, a plurality of $R^5$s in one molecule may be identical to or different from one another.

When $R^3$ is a C1 to C10 aliphatic hydrocarbon group having 2 to 6 bonding sites, the aliphatic hydrocarbon group may be linear-chain or cyclic. Examples of aliphatic hydrocarbon groups having two bonding sites include an ethylene group, a propylene group, a butylene group, a pentylene group, a hexylene group, a heptylene group, an octylene group, a nonylene group, a decylene group, a cyclopentylene group, and a cyclohexylene group. Examples of aliphatic hydrocarbon groups having 2 to 6 bonding sites include residues formed by removing hydroxyl groups from polyhydric alcohols such as trimethylolpropane, glycerin, pentaerythritol, sorbitol, 1,2,3-trihydroxycyclohexane, and 1,3,5-trihydroxycyclohexane.

When the aliphatic hydrocarbon group has more than 10 carbon atoms, compatibility with a refrigerant decreases, possibly causing phase separation. Thus, the hydrocarbon group preferably contains 2 to 6 carbon atoms.

In the present invention, at least one of $R^3$ and $R^5$ is preferably an alkyl group, more preferably a C1 to C3 alkyl group, further more preferably methyl, from the viewpoint of viscosity. For the same reason, each of $R^3$ and $R^5$ is preferably an alkyl group, particularly preferably methyl group.

$R^4$ in formula (II) represents a C2 to C10 alkylene group. Examples of the oxyalkylene group serving as a repeating unit include an oxyethylene group, an oxypropylene group, an oxybutylene group, an oxyhexylene group, an oxyoctylene group, and an oxydecylene group. A plurality of oxyalkylene groups in one molecule may be identical to or different from one another, and one molecule may contains two or more species of oxyalkylene groups.

The "n" in formula (II) is an integer of 1 to 6 and is determined in accordance with the number of bonding sites of $R^3$. For example, when $R^3$ is a monovalent hydrocarbon group or an acyl group, n is 1. When $R^3$ is an aliphatic hydrocarbon group having 2, 3, 4, 5, or 6 bonding sites, n is 2, 3, 4, 5, or 6. The "m" is an average value of 1 to 20. When the average value is in excess of 20, in some cases, the object of the present invention cannot fully be attained.

These oxyalkylene glycol derivatives include monoalkylene glycol diethers [in formula (II), n=1, m=1, $R^3$=a C1 to C10 monovalent hydrocarbon group], polyalkylene glycol diethers (m≧2), mono- or polyalkylene glycol acylated derivatives, and polyalkylene glycol monoether (R³=hydrogen atom).

Among these oxyalkylene glycol derivatives, compounds represented by formula (II) and having 6 to 20 carbon atoms in total are preferred as the low-viscosity base oil (A). Specific examples include dipropylene glycol dimethyl ether (kinematic viscosity at 40° C.: 1.7 mm²/s), butylene glycol dibutyl ether (2.3 mm²/s), polypropylene glycol dimethyl ether (2.1 mm²/s), and polyethylene-polypropylene glycol dimethyl ether (2.8 mm²/s).

In the present invention, a thioether compound, which is formed by substituting all or a part of the oxygen atoms of the ether compound represented by formula (II) by a sulfur atom, may also be employed. Specific examples of thioether compounds serving as the low-viscosity base oil (A) include butylene glycol dimethyl thioether (1.8 mm²/s) and diethylene glycol dimethyl thioether (2.1 mm²/s).

Examples of preferred polyvinyl ethers include polyvinyl ethers each having a repeating unit represented by, for example, the following formula (III):

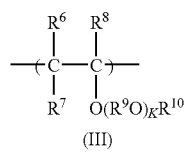

[F1]

(III)

(wherein $R^6$, $R^7$, and $R^8$, which may be identical to or different from one another, each represent a hydrogen atom or a C1 to C8 hydrocarbon group, $R^9$ represents a C1 to C10 divalent hydrocarbon group, $R^{10}$ represents a C1 to C20 hydrocarbon group, and k is an average value of 0 to 10, wherein $R^6$ to $R^8$ may be identical to or different from one another in one unit to another unit, and when a plurality of $R^9O$ are present, these may be identical to or different from one another).

$R^6$, $R^7$, and $R^8$ in formula (III) each represent a hydrogen atom or a C1 to C8, preferably C1 to C4 hydrocarbon group. $R^6$, $R^7$, and $R^8$ may be identical to or different from one another.

The aforementioned polyvinyl ether may be produced through polymerization of one or more corresponding vinyl ether monomers.

Details of the polyvinyl ethers are disclosed in Japanese Patent Application Laid-Open (kokai) No. 2001-49282, paragraphs [0027] to [0045].

Among these polyvinyl ethers, compounds represented by formula (III) and having 8 to 20 carbon atoms in total are preferably employed as the low-viscosity base oil (A).

Specific examples of preferred low-viscosity base oils composed of the polyvinyl ether include poly(ethyl vinyl ether) (2.8 mm²/s) and poly(ethyl vinyl)ether-poly(isobutyl vinyl ether) copolymer (3.5 mm²/s).

Examples of the ketone compound include diketone compounds having a linear-chain, branched-chain, or cyclic alkyl group or alkenyl group. Among them, diketone compounds having 5 to 24 carbon atoms in total are preferred as the low-viscosity base oil (A). Specific examples include dibutyl ketone (kinematic viscosity at 40° C.: 0.9 mm²/s).

Examples of the alcohol compound include monovalent to 6-valent alcohol compounds. Among them, for example, primary and secondary alcohols each having a C2 to C24 linear-chain, branched-chain, or cyclic alkyl group or alkenyl group, and polyhydric (2- to 6-valent) alcohols having 3 to 24 carbon atoms in total are preferred as the low-viscosity base oil (A). Specific examples of the low-viscosity base oil composed of the alcohol compound include 1,2-hydroxydecane (1.1 mm²/s).

In the present invention, a thioalcohol compound, which is formed by substituting all or a part of the oxygen atoms of the alcohol compound by a sulfur atom, may also be employed. Specific examples of thioalcohol compounds serving as the low-viscosity base oil (A) include octyl thioalcohol (0.9 mm²/s) and dodecyl thioalcohol (1.2 mm²/s).

Meanwhile, the high-viscosity base oil (B) may be an appropriate species selected from among (1) a mineral oil, (2) a synthetic hydrocarbon compound, (3) an oxygen-containing compound, and (4) a sulfur-containing compound, which are mentioned in relation to the low-viscosity base oil (A), so long as the species has a kinematic viscosity at 40° C. of 20 to 300 mm²/s. In this case, compounds having 35 to 400 carbon atoms in total are preferred.

In the present invention, the base oil having a kinematic viscosity as specified in (A) or (B) may be one species selected from among the aforementioned (1) to (4). Alternatively, two or more species having an as-specified kinematic viscosity may be used in combination.

The mixed base oil of the present invention composed of the low-viscosity base oil (A) and the high-viscosity base oil (B) essentially has a kinematic viscosity at 40° C. of 0.11 to 8 mm²/s. When the mixed base oil has a kinematic viscosity at 40° C. of 0.11 mm²/s or higher, excellent lubricity and sealing performance can be attained, whereas when the kinematic viscosity is 8 mm²/s or less, the effect of improving energy saving performance can be fully attained. The mixed base oil preferably has a kinematic viscosity at 40° C. of 0.11 to 6 mm²/s, more preferably 0.15 to 2 mm²/s.

The mixed base oil preferably has an average molecular weight of 50 to 660, more preferably 70 to 330. For the purpose of ensuring safety, the mixed base oil preferably has a flash point of 0° C. or higher, more preferably 30° C. or higher, particularly preferably 50° C. or higher.

No particular limitation is imposed on the ratio of low-viscosity base oil (A) to high-viscosity base oil (B) in the mixed base oil. However, the ratio by mass of low-viscosity base oil (A) to high-viscosity base oil (B) represented by (A):(B), is preferably 99 to 5:1 to 95, with 90 to 10:10 to 90 being more preferred. When the ratio falls within the above range, the base oil (A) and the base oil (B) fully play their intrinsic roles, to thereby attain excellent sealing performance and load resistance and exhibit enhanced energy saving performance by virtue of its low viscosity.

The refrigerating machine oil composition of the present invention may further contain at least one species selected from among an extreme pressure agent, an oiliness agent, an antioxidant, an acid-scavenger, a defoaming agent, etc.

Examples of the extreme pressure agent include phosphorus-containing extreme pressure agents such as phosphate esters, acid phosphate esters, phosphite esters, acid phosphite esters, and amine salts thereof.

Among these phosphorus-containing extreme pressure agents, particularly preferred are tricresyl phosphate, trithiophenyl phosphate, tri(nonylphenyl) phosphite, dioleyl hydrogenphosphite, 2-ethylhexyl diphenyl phosphite, etc., from the viewpoints of extreme pressure characteristics and friction characteristics.

Examples of the extreme pressure agent also include carboxylic acid metal salts. The metal carboxylate salts are preferably metal salts of a C3 to C60 carboxylic acid, more preferably a C3 to C30 fatty acid, particularly preferably a C12 to C30 fatty acid. The metal salts also include those of a dimer acid or a trimer acid of the fatty acid, and metal C3 to C30 dicarboxylates. Among them, C12 to C30 fatty acid metal salts and metal C3 to C30 dicarboxylates are particularly preferred. The metal which forms the metal salts is preferably an alkali metal or an alkaline earth metal, with an alkali metal being particularly preferred.

Specific examples of the metal carboxylates include potassium salts, sodium salts, and lithium salts of palmitic acid or oleic acid.

Examples of the extreme pressure agent also include sulfur-containing extreme pressure agents such as sulfidized fats and oils, sulfidized fatty acid, sulfidized esters, sulfidized olefins, dihydrocarbyl polysulfides, thiocarbamates, thioterpene compounds, and dialkyl thiodipropionate compounds.

Generally, the extreme pressure agent is preferably incorporated into the composition in an amount of 0.001 to 5 mass % based on the total amount of the composition, particularly preferably 0.005 to 3 mass %, from the viewpoints of lubricity and stability.

The above extreme pressure agents may be used singly or in combination of two or more species.

Examples of the oiliness agent include aliphatic saturated and unsaturated monocarboxylic acid such as stearic acid and oleic acid; polymerized fatty acids such as dimer acid and hydrogenated dimer acid; hydroxyfatty acids such as ricinoleic acid and 12-hydroxystearic acid; aliphatic saturated and unsaturated monoalcohols such as lauryl alcohol and oleyl alcohol; aliphatic saturated and unsaturated monoamines such as stearylamine and oleylamine; aliphatic saturated and unsaturated monocarboxamide such as laurylamide and oleylamide; and partial esters between a polyhydric alcohol such as glycerin or sorbitol and an aliphatic saturated or unsaturated monocarboxylic acid.

These oiliness agents may be used singly or in combination of two or more species. The amount of the oiliness agent incorporated into the composition is appropriately selected generally from in a range of 0.01 to 10 mass % based on the total amount of the composition, preferably 0.1 to 5 mass %.

The antioxidant incorporated into the composition of the invention is preferably a phenol compound such as 2,6-di-tert-butyl-4-methylphenol, 2,6-di-tert-butyl-4-ethylphenol, or 2,2'-methylenebis(4-methyl-6-tert-butylphenol) or an amine-based antioxidant such as phenyl-α-naphthylamine or N,N'-diphenyl-p-phenylenediamine. The antioxidant is generally incorporated into the composition in an amount of 0.01 to 5 mass %, preferably 0.05 to 3 mass %, form the viewpoints of the effect, cost, etc.

Examples of the acid-scavenger include epoxy compounds such as phenyl glycidyl ether, alkyl glycidyl ether, alkylene glycol glycidyl ether, cyclohexene oxide, α-olefin oxide, and epoxidized soybean oil. Among them, phenyl glycidyl ether, alkyl glycidyl ether, alkylene glycol glycidyl ether, cyclohexene oxide, and α-olefin oxide are preferred, from the viewpoint of compatibility.

The alkyl group of alkyl glycidyl ether and the alkylene group of alkylene glycol glycidyl ether may have a branched-chain and generally have 3 to 30 carbon atoms, preferably 4 to 24 carbon atoms, particularly preferably 6 to 16 carbon atoms. The α-olefin oxide employed in the invention generally has 4 to 50 carbon atoms in total, preferably 4 to 24 carbon atoms, particularly preferably 6 to 16 carbon atoms. In the present invention, the above acid-scavengers may be used singly or in combination of two or more species. Generally, the amount of the acid-scavenger incorporated into the composition is preferably 0.005 to 5 mass % based on the composition, particularly 0.05 to 3 mass %, from the viewpoints of the effect and prevention sludge formation.

In the present invention, the stability of the refrigerating machine oil composition can be enhanced through incorporation of the acid-scavenger thereinto. Through use in combination with the extreme pressure agent and the antioxidant, the stability of the composition can further be enhanced.

Examples of the defoaming agent include silicone oil and fluorinated silicone oil.

To the refrigerating machine oil composition of the present invention, other known additives such as N—[N,N'-dialkyl (C3 to C12 alkyl group)aminomethyl]tolutriazole serving as a steel-deactivating agent may appropriately be added, so long as the additives do not impair the object of the present invention.

The refrigerating machine oil composition of the present invention is preferably employed in a refrigerating machine employing a hydrocarbon-based, carbon dioxide-based, hydrofluorocarbon-based, or ammonia-based refrigerant, particularly preferably to a refrigerating machine employing a hydrocarbon-based refrigerant.

In one method for lubricating a refrigerating machine to which the refrigerating machine oil composition of the invention is applied, any of the aforementioned refrigerants and the refrigerating machine oil composition are preferably used at a ratio by mass of refrigerant/refrigerating machine oil composition of 99/1 to 10/90, more preferably at 95/5 to 30/70. When the amount of refrigerant is less than the aforementioned range, refrigerating performance decreases, whereas when the amount is in excess of the above range, lubricating performance decreases. Both cases are not preferred. The refrigerating machine oil composition of the present invention can be employed in a variety of refrigerating machines and particularly preferably to a compression-refrigeration cycle in a compression-type refrigerator.

The refrigerating machine to which the refrigerating machine oil composition of the present invention is applied employs a refrigeration cycle essentially including a compressor, a condenser, an expansion mechanism (e.g., expansion valves), an evaporator, or including a compressor, a condenser, an expansion mechanism, a drier, and an evaporator. The refrigerating machine employs, as a refrigerating machine oil, the refrigerating machine oil composition of the present invention and any of the aforementioned refrigerants as a refrigerant.

Preferably, the drier is filled with a desiccant composed of zeolite having a pore size of 0.33 nm or less. Examples of the zeolite include natural zeolite and synthetic zeolite. Preferably, the zeolite has a $CO_2$ gas absorption capacity, as measured at 25° C. and a $CO_2$ gas partial pressure of 33 kPa, of 1.0% or less. Examples of such synthetic zeolites include XH-9, XH-600, etc. (products of Union Showa K.K.).

When such a desiccant is employed in the present invention, water can be effectively removed without absorbing refrigerant in a refrigeration cycle, and powdering of the desiccant itself, which would otherwise be caused by deterioration, can be prevented. Thus, clogging of piping by powder as well as anomalous wearing and a similar phenomenon which would otherwise be caused by migration of powder to a sliding member of a compressor can be prevented. As a result, a refrigerator can be operated under stable conditions for a long period of time.

The refrigerating machine to which the refrigerating machine oil composition of the present invention is applied has a variety of sliding members (e.g., bearings) in a compressor. In the present invention, such sliding members are preferably made of an engineering plastic material or are preferably covered with an organic or inorganic coating film, particularly from the viewpoint of sealing performance.

Examples of preferred engineering plastic materials include polyamide resin, polyphenylene sulfide resin, and polyacetal resin, which are advantageous in terms of sealing performance, sliding performance, wear resistance, etc.

Examples of the organic coating film include fluorine-containing resin coating film (e.g., polytetrafluoroethylene coating film), polyimide coating film, and polyamide-imide coating film, which are advantageous in terms of sealing performance, sliding performance, wear resistance, etc.

Examples of the inorganic coating film include graphite film, diamond-like carbon film, nickel film, molybdenum film, tin film, and chromium film, which are advantageous in terms of sealing performance, sliding performance, wear resistance, etc. The inorganic coating film may be formed through plating or through PVD (physical vapor deposition).

The sliding members may be made of a conventional alloy material such as Fe-base alloy, Al-base alloy, or Cu-base alloy.

The refrigerating machine oil composition of the present invention may be employed in hot water supply systems and refrigerating-heating systems for an automobile air conditioner, a gas heat pump, an air conditioner, a refrigerator, an automatic vending machine, and a showcase.

In the present invention, the systems preferably have an inside water content of 60 mass ppm or less, more preferably 50 mass ppm or less, and an inside residual air content of 8 kPa or less, more preferably 7 kPa or less.

The refrigerating machine oil composition of the present invention contains, as a base oil, a mixed base oil composed of at least one species selected from among a mineral oil, a synthetic hydrocarbon compound, an oxygen-containing compound, and a sulfur-containing compound, and having a predetermined viscosity. Thus, the refrigerating machine oil composition exhibits enhanced energy saving performance by virtue of its low viscosity, and has excellent sealing performance and load resistance.

EXAMPLES

The present invention will next be described in more detail by way of examples, which should not be construed as limiting the invention thereto.

The properties of base oils and characteristics of refrigerating machine oil compositions were determined according to the following methods.

<Properties of Base Oils>
(1) Kinematic Viscosity as Determined at 40° C.
Determined in accordance with JIS K2283-1983, by means of a glass capillary viscometer.
(2) Flash Point
Determined in accordance with JIS K2265; i.e., the COC method and the PM method.

<Characteristics of Refrigerating Machine Oil Compositions>
(3) Load at Seizure
Determined in accordance with ASTM D 3233 by means of a closed-type Falex seizure tester under the following conditions: rotation speed; 290 rpm, material of pin; AISIC 1137, material of block; SAE 3135, and blow-by amount of refrigerant (isobutane); 5 L/h.
(4) Shield Tube Test
A catalyst Fe/Cu/Al was placed in a glass tube, which was filled with a mixture of each sample oil/refrigerant (isobutane) (4 mL/1 g), followed by sealing the tube. After the test sample had been maintained at 175° C. for 30 days, the appearance of the oil and catalyst and sludge formation were observed, and the acid value was determined.
(5) Oil Retention Test
An SPCC plate (80×60 mm) was immersed in a test oil so as to cover the surfaces of the plate with the oil. Subsequently, the plate was maintained in an upright posture for 24 hours at room temperature, and the amount (g) of oil remaining on the plate was measured. The larger the amount of oil, the more excellent the oil layer retention characteristics.
(6) Comparison of Sealing Performance
Each of the various sliding members was employed as a piston, and the amount of each sample blowing-bye through the gap between the piston and a cylinder was determined, with comparison. The blow-by amount is represented by an index with respect to a value of 10 (Referential Example 1).

Examples 1 to 16 and Comparative Examples 1 and 2

Refrigerating machine oil compositions having the compositions given in Table 1 were prepared, and the load at seizure of each oil composition was determined. The compositions were subjected to the sealed tube test. Table 1 shows the results.

TABLE 1-1

| | | | Ex. 1 | Ex. 2 | Ex. 3 | Ex. 4 | Ex. 5 |
|---|---|---|---|---|---|---|---|
| | Test Oil No. | | 1 | 2 | 3 | 4 | 5 |
| Amount (mass %) | Base oil | A1 | 52.5 | 42.5 | 32.5 | | |
| | | A2 | | | | 52.5 | |
| | | A3 | | | | | 52.5 |
| | | A4 | | | | | |
| | | A5 | | | | | |
| | | A6 | | | | | |
| | | A7 | | | | | |
| | | A8 | | | | | |
| | | A9 | | | | | |
| | | B1 | 45 | 55 | 65 | 45 | 45 |
| | | B2 | | | | | |
| | | B3 | | | | | |
| | | B4 | | | | | |
| | | B5 | | | | | |
| | | B6 | | | | | |
| | | C1 | | | | | |
| | | C2 | | | | | |
| Kinematic viscosity (40° C.) (mm²/s) of mixed base oil | | | 2.8 | 3.9 | 5.7 | 5.8 | 3.5 |
| Flash point (° C.) of mixed base oil | | | 47 | 49 | 53 | 80 | 51 |

TABLE 1-1-continued

|  |  | | | | | |
|---|---|---|---|---|---|---|
| EP* agent | D1 | 1 | 1 | 1 | 1 | 1 |
| Acid scavenger | D2 | 1 | 1 | 1 | 1 | 1 |
| Antioxidant | D3 | 0.5 | 0.5 | 0.5 | 0.5 | 0.5 |
| Defoamer | D4 | 0.001 | 0.001 | 0.001 | 0.001 | 0.001 |
| Load at seizure | (N) | 2,000 | 2,150 | 2,300 | 2,350 | 2,100 |
| Shield tube test results | Oil appearance | good | good | good | good | good |
|  | Catalyst appearance | good | good | good | good | good |
|  | Sludge | no | no | no | no | no |
|  | Acid value (mgKOH/g) | 0.01> | 0.01> | 0.01> | 0.01> | 0.01> |

|  |  |  | Ex. 6 | Ex. 7 | Ex. 8 | Ex. 9 | Ex. 10 |
|---|---|---|---|---|---|---|---|
|  | Test Oil No. |  | 6 | 7 | 8 | 9 | 10 |
| Amount (mass %) | Base oil | A1 |  |  |  |  |  |
|  |  | A2 |  |  |  |  |  |
|  |  | A3 |  |  |  |  |  |
|  |  | A4 | 72.5 |  |  |  |  |
|  |  | A5 |  | 82.5 |  |  |  |
|  |  | A6 |  |  | 82.5 |  |  |
|  |  | A7 |  |  |  | 82.5 |  |
|  |  | A8 |  |  |  |  | 82.5 |
|  |  | A9 |  |  |  |  |  |
|  |  | B1 | 25 | 15 | 15 | 15 | 15 |
|  |  | B2 |  |  |  |  |  |
|  |  | B3 |  |  |  |  |  |
|  |  | B4 |  |  |  |  |  |
|  |  | B5 |  |  |  |  |  |
|  |  | B6 |  |  |  |  |  |
|  |  | C1 |  |  |  |  |  |
|  |  | C2 |  |  |  |  |  |
| Kinematic viscosity (40° C.) (mm$^2$/s) of mixed base oil |  |  | 4.1 | 3.6 | 3.3 | 2.8 | 3.3 |
| Flash point (° C.) of mixed base oil |  |  | 89 | 135 | 115 | 67 | 99 |
| EP* agent | D1 |  | 1 | 1 | 1 | 1 | 1 |
| Acid scavenger | D2 |  | 1 | 1 | 1 | 1 | 1 |
| Antioxidant | D3 |  | 0.5 | 0.5 | 0.5 | 0.5 | 0.5 |
| Defoamer | D4 |  | 0.001 | 0.001 | 0.001 | 0.001 | 0.001 |
| Load at seizure | (N) |  | 2,200 | 2,150 | 2,050 | 2,000 | 2,100 |
| Shield tube test results | Oil appearance |  | good | good | good | good | good |
|  | Catalyst appearance |  | good | good | good | good | good |
|  | Sludge |  | no | no | no | no | no |
|  | Acid value (mgKOH/g) |  | 0.01> | 0.01> | 0.01> | 0.01> | 0.01> |

*extreme pressure agent

TABLE 1-2

|  |  |  | Ex. 11 | Ex. 12 | Ex. 13 | Ex. 14 |
|---|---|---|---|---|---|---|
|  | Test Oil No. |  | 11 | 12 | 13 | 14 |
| Amount (mass %) | Base oil | A1 | 47.5 |  |  |  |
|  |  | A2 |  |  |  |  |
|  |  | A3 |  |  | 47.5 |  |
|  |  | A4 |  |  |  |  |
|  |  | A5 |  |  |  | 82.5 |
|  |  | A6 |  |  |  |  |
|  |  | A7 |  |  |  |  |
|  |  | A8 |  |  |  |  |
|  |  | A9 | 82.5 |  |  |  |
|  |  | B1 | 15 |  |  |  |
|  |  | B2 |  | 50 |  |  |
|  |  | B3 |  |  | 50 |  |
|  |  | B4 |  |  |  | 15 |
|  |  | B5 |  |  |  |  |
|  |  | B6 |  |  |  |  |
|  |  | C1 |  |  |  |  |
|  |  | C2 |  |  |  |  |
| Kinematic viscosity (40° C.) (mm$^2$/s) of mixed base oil |  |  | 3.1 | 4.2 | 4.8 | 3.8 |
| Flash point (° C.) of mixed base oil |  |  | 143 | 49 | 52 | 136 |

TABLE 1-2-continued

|  |  |  |  |  |  |
|---|---|---|---|---|---|
| EP* agent | D1 | 1 | 1 | 1 | 1 |
| Acid scavenger | D2 | 1 | 1 | 1 | 1 |
| Antioxidant | D3 | 0.5 | 0.5 | 0.5 | 0.5 |
| Defoamer | D4 | 0.001 | 0.001 | 0.001 | 0.001 |
| Load at seizure | (N) | 2,000 | 2,400 | 2,500 | 2,100 |
| Shield tube test results | Oil appearance | good | good | good | good |
|  | Catalyst appearance | good | good | good | good |
|  | Sludge | no | no | no | no |
|  | Acid value (mgKOH/g) | 0.01> | 0.01> | 0.01> | 0.01> |

|  |  |  | Ex. 15 | Ex. 16 | Comp. Ex. 1 | Comp. Ex. 2 |
|---|---|---|---|---|---|---|
|  | Test Oil No. |  | 15 | 16 | 17 | 18 |
| Amount (mass %) | Base oil | A1 |  |  |  | 47.5 |
|  |  | A2 |  |  |  |  |
|  |  | A3 |  |  |  |  |
|  |  | A4 |  |  |  |  |
|  |  | A5 |  |  |  |  |
|  |  | A6 | 82.5 |  |  |  |
|  |  | A7 |  |  |  |  |
|  |  | A8 |  |  |  |  |
|  |  | A9 |  | 82.5 |  |  |
|  |  | B1 |  |  | 20 |  |
|  |  | B2 |  |  |  |  |
|  |  | B3 |  |  |  |  |
|  |  | B4 |  |  |  |  |
|  |  | B5 | 15 |  |  |  |
|  |  | B6 |  | 15 |  |  |
|  |  | C1 |  |  | 77.5 |  |
|  |  | C2 |  |  |  | 50 |
| Kinematic viscosity (40° C.) (mm$^2$/s) of mixed base oil |  |  | 3.5 | 3.3 | 3.7 | 3.8 |
| Flash point (° C.) of mixed base oil |  |  | 117 | 141 | 185 | 49 |
| EP* agent | D1 |  | 1 | 1 | 1 | 1 |
| Acid scavenger | D2 |  | 1 | 1 | 1 | 1 |
| Antioxidant | D3 |  | 0.5 | 0.5 | 0.5 | 0.5 |
| Defoamer | D4 |  | 0.001 | 0.001 | 0.001 | 0.001 |
| Load at seizure | (N) |  | 2,050 | 2,100 | 230 | 270 |
| Shield tube test results | Oil appearance |  | good | good | good | good |
|  | Catalyst appearance |  | good | good | good | good |
|  | Sludge |  | no | no | no | no |
|  | Acid value (mgKOH/g) |  | 0.01> | 0.01> | 0.01> | 0.01> |

*extreme pressure agent

[Note]
A1: Naphthene-base mineral oil, kinematic viscosity (40° C.) = 0.98 mm$^2$/s, S content = 25 mass ppm, flash point = 45° C., av. molecular weight = 120, and molecular weight distribution = 1.1
A2: Paraffin-base mineral oil, kinematic viscosity (40° C.) = 2.24 mm$^2$/s, S content = ≦1 mass ppm, flash point = 78° C., av. molecular weight = 170, and molecular weight distribution = 1.1
A3: $C_4$ olefin (isobutene based) oligomer, kinematic viscosity (40° C.) = 1.25 mm$^2$/s, flash point = 49° C., av. molecular weight = 142, and molecular weight distribution = 1.2
A4: $C_4$ olefin (isobutene based) oligomer, kinematic viscosity (40° C.) = 2.56 mm$^2$/s, flash point = 87° C., av. molecular weight = 180, and molecular weight distribution = 1.3
A5: 1-Octene dimer hydrogenated product (produced in the presence of metallocene catalyst), kinematic viscosity (40° C.) = 2.78 mm$^2$/s, flash point = 132° C., molecular weight = 226, and molecular weight distribution = 1
A6: Decylbenzene, kinematic viscosity (40° C.) = 2.54 mm$^2$/s, flash point = 110° C., molecular weight = 218, and molecular weight distribution = 1
A7: Polypropylene glycol dimethyl ether, kinematic viscosity (40° C.) = 2.1 mm$^2$/s, flash point = 65° C., molecular weight = 160, and molecular weight distribution = 1.3
A8: Poly(ethyl vinyl ether), kinematic viscosity (40° C.) = 2.5 mm$^2$/s, flash point = 95° C., molecular weight = 180, and molecular weight distribution = 1.2
A9: Ethyl dodecyl ether, kinematic viscosity (40° C.) = 2.35 mm$^2$/s, flash point = 138° C., molecular weight = 242, and molecular weight distribution = 1
B1: Naphthene-base mineral oil, kinematic viscosity (40° C.) = 32.7 mm$^2$/s, and S content = 300 mass ppm
B2: Paraffin-base mineral oil, kinematic viscosity (40° C.) = 100.2 mm$^2$/s, and S content = 5 mass ppm
B3: 1-Decene oligomer, kinematic viscosity (40° C.) = 63.1 mm$^2$/s
B4: Alkylbenzene, kinematic viscosity (40° C.) = 56.3 mm$^2$/s
B5: Polypropylene glycol dimethyl ether, kinematic viscosity (40° C.) = 42.1 mm$^2$/s
B6: Poly(ethyl vinyl ether), kinematic viscosity (40° C.) = 68.3 mm$^2$/s
C1: Silicone oil, kinematic viscosity (40° C.) = 2.55 mm$^2$/s
C2: Silicone oil, kinematic viscosity (40° C.) = 56.5 mm$^2$/s
D1: Tricresyl phosphate
D2: $C_{14}$ α-Olefin oxide
D3: 2,6-Di-t-butyl-4-methylphenol
D4: Silicone defoaming agent As is clear from Table 1, the refrigerating machine oil compositions (Examples 1 to 16) according to the present invention exhibited loads at seizure higher than those obtained in Comparative Examples 1 and 2, and excellent performance in the shield tube test.

Examples 17 and 18, and Comparative Examples 3 and 4

The load at seizure and oil retention amount of each of the test oils given in Table 2 were determined. Table 2 shows the results.

TABLE 2

|  |  |  | Ex. 17 | Ex. 18 | Comp. Ex. 3 | Comp. Ex. 4 |
|---|---|---|---|---|---|---|
|  | Test Oil No. |  | 12 | 13 | 19 | 20 |
| Amount (mass %) | Base oil | A1 | 47.5 |  |  |  |
|  |  | A2 |  | 47.5 |  |  |
|  |  | B2 | 50 |  |  |  |
|  |  | B3 |  | 50 |  |  |
|  |  | C3 |  |  | 97.5 |  |
|  |  | C4 |  |  |  | 97.5 |
|  | Kinematic viscosity (40° C.) (mm²/s) of mixed base oil |  | 4.2 | 4.8 | 4.2 | 4.9 |
|  | EP* agent | D1 | 1 | 1 | 1 | 1 |
|  | Acid scavenger | D2 | 1 | 1 | 1 | 1 |
|  | Antioxidant | D3 | 0.5 | 0.5 | 0.5 | 0.5 |
|  | Defoamer | D4 | 0.001 | 0.001 | 0.001 | 0.001 |
|  | Load at seizure (N) |  | 2,400 | 2,500 | 1,700 | 1,900 |
|  | Amount of oil retention (g) |  | 1.3 | 1.1 | 0.4 | 0.2 |

*extreme pressure agent

[Note]
C3: Naphthene-base mineral oil, kinematic viscosity (40° C.) = 4.2 mm²/s, S content = 20 mass ppm, flash point = 145° C., av. molecular weight = 310, and molecular weight distribution = 1.2
C4: 1-Decene dimer, kinematic viscosity (40° C.) = 4.9 mm²/s, flash point = 172° C., av. molecular weight = 282, and molecular weight distribution = 1

Other components are the same as given in Table 1.

As is clear from Table 2, the refrigerating machine oil compositions of Examples 17 and 18, composed of a mixed base oil falling within the scope of the invention, exhibited higher load at seizure and larger oil retention amount, as compared with similar compositions of Comparative Examples 3 and 4 formed of a single base oil.

Examples 19 to 22 and Referential Example 1

The test oils given in Table 3 were subjected to comparative sealing performance employing a sliding member given in Table 3. Table 3 shows the results.

TABLE 3

|  | Ex. 19 | Ex. 20 | Ex. 21 | Ex. 22 | Ref. Ex. 1 |
|---|---|---|---|---|---|
| Test oil No. | 12 | 13 | 13 | 13 | 13 |
| Sliding member | E1 | E2 | E3 | E4 | E5 |
| Blow-by amount (relative) | 3> | 3> | 3> | 8 | 10 |

[Note]
E1: Poly(phenylene sulfide)
E2: Fluorine-containing polymer coating film
E3: Polyimide coating film
E4: Tin-plated film
E5: Aluminum alloy As is clear from Table 3, Examples 19 to 22, employing a sliding member made of an engineering plastic material or an organic or inorganic coating film, exhibited small blow-by amounts, as compared with Referential Example 1 employing a sliding member not made of such a material. In Examples 19 to 22, good sealing performance was attained.

INDUSTRIAL APPLICABILITY

The refrigerating machine oil composition according to the present invention exhibits enhanced energy saving performance by virtue of its low viscosity, has excellent sealing performance and load resistance, and can be employed in various refrigeration fields, particularly suitably in a closed-type refrigerator.

The invention claimed is:

1. A refrigerating machine oil composition, comprising a mixed base oil which has a kinematic viscosity at 40° C. of 0.11 to 6 mm²/s and which is composed of a low-viscosity base oil (A) having a kinematic viscosity at 40° C. of 5 mm²/s or lower, and a high-viscosity base oil (B) having a kinematic viscosity at 40° C. of 20 to 400 mm²/s, each of the base oil (A) and (B) being composed of at least one species selected from the group consisting of a mineral oil, a synthetic hydrocarbon compound, an oxygen-containing compound, and a sulfur-containing compound.

2. A refrigerating machine oil composition as described in claim 1, wherein the low-viscosity base oil (A) has a kinematic viscosity at 40° C. of 0.1 to 2.8 mm²/s.

3. A refrigerating machine oil composition as described in claim 1, which has a ratio by mass of low-viscosity base oil (A) to high-viscosity base oil (B), represented by (A):(B), is 99 to 5:1 to 95.

4. A refrigerating machine oil composition as described in claim 1, wherein the low-viscosity base oil is composed of a mineral oil and has a sulfur content of 50 mass ppm or less.

5. A refrigerating machine oil composition as described in claim 1, wherein the synthetic hydrocarbon compound is at least one compound selected from a C2 to C20 olefin homopolymer or copolymer, a hydrogenation product thereof, an alicyclic hydrocarbon compound having a cyclohexyl group, and a linear-chain or branched-chain alkyl group-substituted aromatic compound.

6. A refrigerating machine oil composition as described in claim 1, wherein the synthetic hydrocarbon compound is a C6 to C20 α-olefin oligomer or a hydrogenation product of the α-olefin oligomer.

7. A refrigerating machine oil composition as described in claim 6, wherein the C6 to C20 α-olefin oligomer is produced in the presence of a metallocene catalyst.

8. A refrigerating machine oil composition as described in claim 1, wherein the oxygen-containing compound or the sulfur-containing compound is at least one compound selected from among an ether compound, a thioether compound, a ketone compound, an alcohol compound, and a thioalcohol compound.

9. A refrigerating machine oil composition as described in claim 8, wherein the ether compound is at least one compound selected from among a monoether compound, an oxyalkylene glycol derivative, and a polyvinyl ether compound.

10. A refrigerating machine oil composition as described in claim 1, which contains at least one additive selected from among an extreme pressure agent, an oiliness agent, an antioxidant, an acid-scavenger, and a defoaming agent.

11. A refrigerating machine oil composition as described in claim 1, which is employed in a refrigerating machine employing a hydrocarbon-based, carbon dioxide-based, hydrofluorocarbon-based, or ammonia-based refrigerant.

12. A refrigerating machine oil composition as described in claim 11, which is employed in a refrigerating machine employing a hydrocarbon-based refrigerant.

13. A refrigerating machine oil composition as described in claim 1, which is employed in a refrigerating machine having a sliding member made of an engineering plastic material or covered with an organic or inorganic coating film.

14. A refrigerating machine oil composition as described in claim 13, wherein the organic coating film is polytetrafluoroethylene coating film, polyimide coating film, or polyamide-imide coating film.

15. A refrigerating machine oil composition as described in claim 13, wherein the inorganic coating film is graphite film, diamond-like carbon film, tin film, chromium film, nickel film, or molybdenum film.

16. A refrigerating machine oil composition as described in claim 1, which is for use in a refrigerating system, a hot water supply system, or a refrigerating-heating system of an automobile air conditioner, a gas heat pump, an air conditioner, a refrigerator, an automatic vending machine, or a showcase.

17. A refrigerating machine oil composition as described in claim 16, wherein the systems have an inside water content of 60 mass ppm or less and an inside residual air content of 8 kPa or less.

18. A refrigerating machine oil composition as described in claim 1, wherein the mixed base oil has a kinematic viscosity at 40° C. of 0.15 to 2 $mm^2/s$.

* * * * *